US009344816B2

(12) United States Patent
Larsen et al.

(10) Patent No.: US 9,344,816 B2
(45) Date of Patent: May 17, 2016

(54) HEARING AID SYSTEM AND A HEARING AID

(71) Applicant: Widex A/S, Lynge (DK)

(72) Inventors: Soren Mollskov Larsen, Varlose (DK); Morten Kroman, Taastrup (DK)

(73) Assignee: Widex A/S, Lynge (DK)

( * ) Notice: Subject to any disclaimer, the term of this patent is extended or adjusted under 35 U.S.C. 154(b) by 108 days.

(21) Appl. No.: 13/826,702

(22) Filed: Mar. 14, 2013

(65) Prior Publication Data

US 2013/0195300 A1 Aug. 1, 2013

Related U.S. Application Data

(63) Continuation-in-part of application No. PCT/EP2011/050146, filed on Jan. 7, 2011.

(51) Int. Cl.
*H04R 25/00* (2006.01)
*H01Q 1/00* (2006.01)
*H04B 5/00* (2006.01)

(52) U.S. Cl.
CPC ............... *H04R 25/554* (2013.01); *H01Q 1/00* (2013.01); *H04B 5/0006* (2013.01)

(58) Field of Classification Search
CPC ............... H04R 25/558; H04R 25/552; H04R 2225/51; H04R 2225/55; H04B 13/005; H04B 11/00; H04M 1/05; H04M 1/6066; H04M 2250/02; H03D 3/04; H04W 74/085
USPC ........ 381/312, 315, 374, 313; 455/41.1, 41.2, 455/569.1, 575.2; 375/259
See application file for complete search history.

(56) References Cited

U.S. PATENT DOCUMENTS

| 5,231,355 | A | * | 7/1993 | Rider ........................ G01V 3/08 |
| | | | | 324/326 |
| 5,615,229 | A | * | 3/1997 | Sharma et al. ................ 375/259 |
| 5,787,126 | A | * | 7/1998 | Itoh et al. ...................... 375/340 |
| 6,118,882 | A | * | 9/2000 | Haynes ......................... 381/374 |
| 7,529,565 | B2 | * | 5/2009 | Hilpisch et al. ............. 455/569.1 |
| 8,483,417 | B2 | * | 7/2013 | Huttinger ...................... 381/315 |
| 2005/0111682 | A1 | | 5/2005 | Essabar et al. |

(Continued)

FOREIGN PATENT DOCUMENTS

| EP | 1531649 A2 | 5/2005 |
| EP | 2052758 A1 | 4/2009 |

(Continued)

OTHER PUBLICATIONS

International Search Report for PCT/EP2011/050146 dated Sep. 8, 2011.

(Continued)

*Primary Examiner* — Davetta W Goins
*Assistant Examiner* — Phylesha Dabney
(74) *Attorney, Agent, or Firm* — Sughrue Mion, PLLC

(57) ABSTRACT

A hearing aid (100) comprises first wireless link means configured to receive a first data signal using a first carrier frequency and second wireless link means configured to receive a second data signal using a second carrier frequency and wherein a first electrical antenna of the first wireless link means also forms part of a first band pass filter of the second wireless link means. The invention provides a hearing aid, a binaural hearing aid system and a method of receiving a first and second wireless signal.

18 Claims, 2 Drawing Sheets

(56) References Cited

U.S. PATENT DOCUMENTS

| | | | |
|---|---|---|---|
| 2005/0136839 A1* | 6/2005 | Seshadri et al. | 455/41.2 |
| 2006/0039577 A1 | 2/2006 | Sanguino et al. | |
| 2007/0037615 A1* | 2/2007 | Glezerman | 455/575.2 |
| 2008/0076489 A1* | 3/2008 | Rosener et al. | 455/575.2 |
| 2008/0300658 A1* | 12/2008 | Meskens | A61N 1/08 607/60 |
| 2009/0046879 A1* | 2/2009 | Knudsen et al. | 381/315 |
| 2010/0278367 A1* | 11/2010 | Huttinger | H04R 25/558 381/315 |
| 2011/0286608 A1* | 11/2011 | Hautier et al. | 381/72 |
| 2012/0002830 A1* | 1/2012 | Solum | 381/315 |
| 2015/0016645 A1* | 1/2015 | Bauman | H04R 25/554 381/315 |

FOREIGN PATENT DOCUMENTS

| | | | |
|---|---|---|---|
| EP | 2824942 A1 * | 1/2015 | |
| WO | 2009/062500 A1 | 5/2009 | |
| WO | 2010/043223 A1 | 4/2010 | |

OTHER PUBLICATIONS

Written Opinion of the International Searching Authority dated Jan. 7, 2011.

Behzad Razavi, "Architectures and Circuits for RF CMOS Receivers", IEEE 1998 Custom Integrated Circuits Conference.

Nora Yan, "On-Chip Image Reject Techniques for Wireless Receivers", University of Toronto, Department of Electrical and Computer Engineering, Nov. 12, 2001.

* cited by examiner

HEARING AID SYSTEM AND A HEARING AID

RELATED APPLICATIONS

The present application is a continuation-in-part of application PCT/EP2011/050146, filed on 7 Jan. 2011, in Europe, and published as WO2012092973 A1.

BACKGROUND OF THE INVENTION

1. Field of the Invention

The present invention relates to hearing aids. The invention more specifically relates to hearing aid systems having a dual mode wireless radio.

In the context of the present disclosure, a hearing aid should be understood as a small, microelectronic device designed to be worn behind or in a human ear of a hearing-impaired user. A hearing aid system may be monaural and comprise only one hearing aid or be binaural and comprise two hearing aids. Prior to use, the hearing aid is adjusted by a hearing aid fitter according to a prescription. The prescription is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit. A hearing aid comprises one or more microphones, a microelectronic circuit comprising a signal processor, and an acoustic output transducer. The signal processor is preferably a digital signal processor. The hearing aid is enclosed in a casing suitable for fitting behind or in a human ear.

As the name suggests, Behind-The-Ear (BTE) hearing aids are worn behind the ear. To be more precise, an electronics unit comprising a housing containing the major electronics parts thereof is worn behind the ear. An earpiece for emitting sound to the hearing aid user is worn in the ear, e.g. in the concha or the ear canal. In a traditional BTE hearing aid, a sound tube is used because the output transducer, which in hearing aid terminology is normally referred to as the receiver, is located in the housing of the electronics unit. In some modern types of hearing aids a conducting member comprising electrical conductors is used, because the receiver is placed in the earpiece in the ear. Such hearing aids are commonly referred to as Receiver-In-The-Ear (RITE) hearing aids. In a specific type of RITE hearing aids the receiver is placed inside the ear canal. This is known as Receiver-In-Canal (RIC) hearing aids.

In-The-Ear (ITE) hearing aids are designed for arrangement in the ear, normally in the funnel-shaped outer part of the ear canal. In a specific type of ITE hearing aids the hearing aid is placed substantially inside the ear canal. This type is known as Completely-In-Canal (CIC) hearing aids. This type of hearing aid requires a very compact design in order to allow it to be arranged in the ear canal, while accommodating the components necessary for operation of the hearing aid.

State-of-the-art hearing aids are usually designed to accept more than one signal source for advanced functionalities for the purpose of amplifying, conditioning and reproducing them by virtue of the hearing aid circuitry. Such signal sources are e.g. televisions, mp3 players and mobile phones.

Some hearing aids have means for connecting external equipment to the hearing aid circuitry, such as FM-receivers, Bluetooth® receivers, cables etc. Such external equipment enables communication with the hearing aid in various ways. An FM-receiver may be connected for use in public address situations where a speaker is wearing a microphone with a wireless FM transmitter. A Bluetooth® receiver may be used for streaming audio signals from a mobile telephone or the like.

Some hearing aid types also comprise internal wireless receivers such as e.g. inductive receivers. Most of these wireless receivers draw their power directly from the hearing aid battery.

Prolonged use of external equipment or wireless receivers known in the art may lead to rapid depletion of the hearing aid battery necessitating frequent battery changes and adding to the cost of operation of the hearing aid. Receiver types having integral power supplies comprising a separate battery add to the weight, size and complexity of the receiver. More power-efficient wireless equipment would thus be of great benefit to hearing aid users.

In some hearing aid types a wireless link is provided between the two hearing aids of a binaural hearing aid system. In this case an inductive wireless link is particularly advantageous because the power consumption can be very low over such small distances. Further, since the hearing aids of the binaural hearing aid system are adapted to be worn in or at a left and right ear of a hearing aid user, it is advantageous to employ an inductive wireless link because the magnetic field signals transmitted by the inductive wireless link are not significantly attenuated by the head of the hearing aid user.

In yet other types of hearing aids an inductive radio is used to receive audio signals from external signal sources or external relay devices. In this type of hearing aid systems the external signal source or the external relay device must be within close range (typically less than one meter) because the transmission and reception range of the inductive radio falls off approximately with the distance raised to the third power.

2. The Prior Art

WO-A1-2010043223 discloses a DVD player, which is connected to a television set, a first external device, a second external device and a binaural hearing aid system, wherein the first external device is dedicated for encoding and wirelessly transmitting an audio signal, provided by the DVD player, to the second external device, which is adapted for relaying wirelessly the audio signal further on to the binaural hearing aid system. The second external device ensures that the wireless signal transmission consumes a minimum of electrical power in the hearing aids.

It is a feature of the present invention to provide a hearing aid with improved wireless link means, hereby providing a hearing aid with a longer wireless range while maintaining a small hearing aid size and low power consumption.

It is still another feature of the present invention to provide an improved method for transmitting and receiving wireless signals.

SUMMARY OF THE INVENTION

The invention, in a first aspect, provides a hearing aid comprising first wireless link means configured to receive a first data signal using a first carrier frequency; second wireless link means configured to receive a second data signal using a second carrier frequency; wherein the second wireless link means comprises frequency mixing means configured such that a frequency mixed signal with a down-mixed intermediate carrier frequency is provided, wherein the down-mixed intermediate carrier frequency corresponds to the first carrier frequency of the first wireless link means.

This provides a hearing aid with improved wireless range.

The invention, in a second aspect, provides a binaural hearing aid system comprising a first hearing aid comprising first wireless link means configured to receive a first data signal using a first carrier frequency; second wireless link means configured to receive a second data signal using a second carrier frequency; wherein the second wireless link means comprises frequency mixing means configured such that a frequency mixed signal with a down-mixed intermediate carrier frequency is provided, wherein the down-mixed intermediate carrier frequency corresponds to the first carrier frequency of the first wireless link mean, and a second hearing aid, wherein said first wireless link means is configured to exchange data between said first and said second hearing aid.

The invention, in a third aspect, provides a method of receiving a first wireless signal and a second wireless signal in a hearing aid comprising the steps of receiving a first wireless signal, having a first carrier frequency, using a first electrical antenna; receiving a second wireless signal, having a second carrier frequency, using a second electrical antenna; frequency mixing said second wireless signal, hereby providing a frequency mixed signal with a down-mixed intermediate carrier frequency; band pass filtering said frequency mixed signal using a band pass filter, wherein said band pass filter comprises said first electrical antenna and is configured to pass said down-mixed intermediate carrier frequency, hereby providing a frequency down-mixed signal; demodulating and decoding said first wireless signal using first demodulating and decoding means; and demodulating and decoding said frequency down-mixed signal using said first demodulating and decoding means.

This provides an improved method of receiving wireless signals, in a hearing aid, with respect to power consumption and size.

Further advantageous features appear from the dependent claims.

Still other features of the present invention will become apparent to those skilled in the art from the following description wherein the invention will be explained in greater detail.

BRIEF DESCRIPTION OF THE DRAWINGS

By way of example, there is shown and described a preferred embodiment of this invention. As will be realized, the invention is capable of other embodiments, and its several details are capable of modification in various, obvious aspects all without departing from the invention. Accordingly, the drawings and descriptions will be regarded as illustrative in nature and not as restrictive. In the drawings.

DETAILED DESCRIPTION

Figure 1:
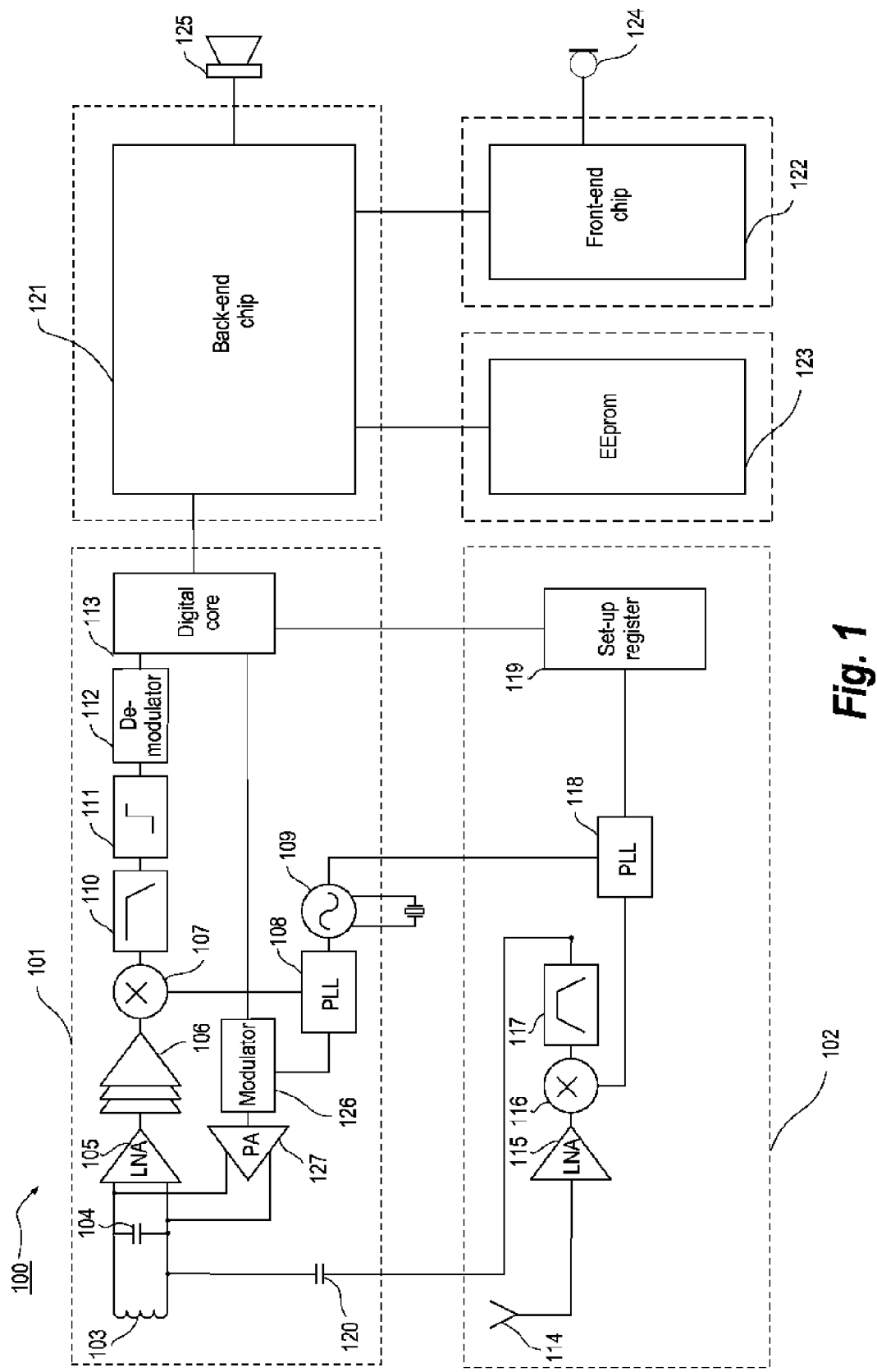
FIG. 1 illustrates highly schematically a hearing aid according to a first embodiment of the invention.

In the context of the present invention a distinction is made between two types of wireless radios, wireless link means or wireless transmission methods.

The first type of wireless radio is adapted for short range communication. This type of radio could also be denoted inductive, low-frequency or near-field. In a typical implementation a short-range radio is designed such that the characteristics of the interaction between the transmitter and receiver of the wireless link are primarily determined by magnetic induction in the near-field. The term low-frequency is to be interpreted as a relative term that must be compared with the corresponding term high-frequency that is used to denote the second type of wireless radio described below.

The second type of wireless radio is adapted for long range communication. This type of radio could also be denoted Radio Frequency (RF), high-frequency or far-field. In a typical implementation a long-range radio is designed such that the characteristics of the interaction between the transmitter and receiver of the wireless link are primarily determined by electromagnetic waves in the far-field. The term high-frequency is to be interpreted as a relative term that must be compared with the corresponding term low-frequency that is used to denote the first type of wireless radio described above.

As will be well known the terms near-field and far-field are not fixed terms, but depends on e.g. the selected frequency, antenna design and distances involved for the given wireless transmission type.

Generally the range of wireless hearing aid radios can be increased by using a far-field radio instead of an inductive radio, when a wireless signal is to be received from an external device. This is primarily a result of the fact that the far-field radio provides signals with a strength that approximately falls off with the distance squared, whereas an inductive radio provides signals with a strength that falls off with the distance raised to the third power.

However, inductive antennas are generally significantly smaller than far-field antennas and this makes the inductive radio advantageous for implementation in hearing aids where a continuous drive for miniaturization exists, especially in cases where a limited transmission range is required.

Generally the size of far-field antennas decreases with increasing carrier frequency. It is therefore important to use a relatively high carrier frequency in order to make room for a far-field antenna in a hearing aid. However, when increasing the carrier frequency it becomes increasingly difficult to filter out the desired signal with a high selectivity, simply because the design of a band pass filter with a narrow bandwidth (high Q factor) becomes more difficult when increasing the carrier frequency. Further the power consumption of wireless radios typically increase with increasing frequency.

One way of alleviating these drawbacks of high carrier frequency systems is to employ super heterodyne detection. In a super heterodyne receiver the carrier frequency is down-mixed to an intermediate frequency and, if required, the intermediate frequency can be further down-mixed, in which case the method is called double super heterodyne detection. Hereby the band pass filtering of the signal can be carried out at the lower intermediate frequency, where more efficient band pass filters are available.

Generally digital on-chip band pass filters are inferior in performance relative to analog off-chip band pass filters, but analog filters on the other hand take up significantly more space and consume more power. In a hearing aid, space is generally not easily available and power is likewise a critical resource.

According to an embodiment of the invention it has been found that a far-field radio with increased range can be implemented in a hearing aid by down-mixing the carrier frequency of the far-field signal to an intermediate frequency that corresponds to the carrier frequency of the inductive radio and by using the same digital modulation technique and wireless protocol for the long-range far-field radio and the inductive short-range radio. Hereby the inductive short-range radio constitutes the second half of the long-range far-field radio and in this way an additional analog off-chip band pass filter for the long-range far-field radio is not required because the inductive antenna and its corresponding resonance circuit constitutes such a filter.

Hereby a dual mode hearing aid system can be provided that has a significantly improved wireless reception range when communicating with external devices, while maintaining a hearing aid of relatively small size and keeping the power consumption low because fewer components are required relative to hearing aid systems with e.g. two separate radios or a binaural system without the low power inductive short-range radio.

It is a further advantage that this method constitutes a very simple way of modifying existing hearing aid systems to improve the wireless range when communicating with external devices.

Basically the hearing aid will not be able to recognize whether a wireless signal has been received over the inductive short-range radio or the long-range radio, until the received signal data has been fully demodulated, decoded and interpreted. It is therefore important that the selected wireless protocol is arranged such that a wireless transmission comprises time slots without signal transmission.

Hereby a binaural hearing aid system can configure itself such that wireless exchange of data between the hearing aids, using the inductive short-range radio, can take place during the above mentioned transmission free time slots of an otherwise continuous reception of a far-field signal.

Generally the reception of a continuous long-range wireless transmission can be interrupted by using standard means. One such means is to activate buttons on a hearing aid adapted for de-activating central components of the long-range radio. Another means is to transmit an off-signal from a remote control and to the hearing aid using the inductive short-range radio, wherein the remote control is adapted to provide an inductive wireless signal that can drown out the signal received using the long-range radio. This can typically be achieved by positioning the remote control very close to the hearing aid.

Reference is first made to FIG. 1, which illustrates highly schematically a hearing aid according to a first embodiment of the invention.

The hearing aid 100 comprises an acoustical-electrical input transducer 124, a front end chip 122, an EEprom chip 123, a back end chip 121 and an electrical-acoustical output transducer 125. These components together provide the basic hearing aid functionality.

The hearing aid 100 further comprises an inductive short-range radio 101 having an inductive antenna 103, a resonance capacitor 104, a first low noise amplifier (LNA) 105, a set of pre-amplifiers 106, a first mixer 107, a first phase locked loop (PLL) 108, a local oscillator 109, a first intermediate filter 110, a limiter 111, a demodulator block 112 and the digital core 113 of the inductive short-range radio comprising e.g. the clock data recovery block, wireless data decoding means and means for controlling the wireless signal reception and transmission in accordance with the selected protocol.

Additionally the hearing aid 100 comprises a long-range radio 102 having a far-field antenna 114, a second low noise amplifier 115, a second mixer 116, a second intermediate filter 117, a coupling capacitor 120, a second phase locked loop 118 and setup registers 119.

The inductive short-range radio 101 is adapted to pick up an electromagnetic signal with a carrier frequency of 10.6 MHz hereby providing a first electrical input signal.

In variations of the embodiment according to FIG. 1 the carrier frequency for the inductive short-range radio can be selected in a range between 0.5 MHz and 30 MHz, or more specifically in the range between 3 and 12 MHz. In practice the choice of carrier frequency primarily depends on national regulations governing the frequency bands available for wireless data transmission.

In order to optimize the reception of the electromagnetic signal the inductive antenna 103, in the form of a coil, and the resonance capacitor 104 are arranged such that they together form a resonant circuit that is tuned to a resonance frequency corresponding to the carrier frequency of the received electromagnetic signal. According to the embodiment of FIG. 1 the inductive antenna 103 has 70 windings wound around a ferrite core, a length of 4.9 mm and a diameter of 1.8 mm resulting in an inductance of 30 µH, while the resonance capacitor 104 is coupled in parallel with the inductive antenna 103 and has a capacitance of 7.4 pF. This provides a resonant circuit that functions as a highly selective first band pass filter with a Q value of around 25 and a bandwidth in the order of 400 kHz around the center frequency of 10.6 MHz.

In variations of the embodiment according to FIG. 1 the coil inductance can be selected in the range between 10 and 100 µH and the corresponding resonance capacitance can be selected in the range between 2.5 and 22 pF.

The first electrical input signal is amplified to a suitable level by the first LNA 105 and the set of pre-amplifiers 106 hereby providing a first amplified input signal.

Next the first amplified input signal is mixed down in frequency using the local oscillator 109, the first PLL 108 and the first mixer 107. The local oscillator 109 has a clock frequency of 32 MHz and the first PLL 108 interacts with the local oscillator 109, using the well known principles of PLL based frequency synthesizers in order to provide a mixing signal with a frequency of 10.6 MHz. The mixing signal is multiplied with the first amplified input signal in the first mixer 107 in order to provide a first frequency mixed input signal.

The frequency mixed input signal comprises a sum frequency component with a center frequency of 21.2 MHz and a difference frequency component with a center frequency of zero—i.e. a base band signal. Subsequently the low pass filter 110 provides a first filtered input signal where the sum frequency component is removed, from the first frequency mixed input signal, and the difference frequency component is maintained.

The first filtered input signal is conditioned by the first limiter 111 and fed to the demodulator block 112, which demodulates the electrical signal in accordance with the selected modulation scheme. Basically any type of digital modulation technique can be selected. Examples of digital modulation techniques are e.g. phase-shift keying (PSK) and frequency-shift keying (FSK).

According to a variation of the present embodiment according to FIG. 1 the down mixing and demodulation, i.e. the local oscillator 108, the mixer 107, the low pass filter 110, the first limiter 111 and the demodulator block 112 are implemented as described and shown in WO-A1-2009/062500, page 7, line 30 to page 12, line 11 and FIG. 5. Hereby the first amplified input signal is split into five branches, wherein five sets of oscillators and mixers provide five frequency mixed input signals that are subsequently filtered and conditioned by five sets of filters and limiters that feed five signals to the demodulator block, which demodulates the signals in accordance with the Frequency Shift Keying (FSK) modulation scheme. According to this variation the low pass filters has a bandwidth of 400 kHz. The low pass filters therefore provide filtered input signals where the sum frequency component is removed from the signals and the difference frequency component is maintained.

In a final step of receiving a wireless signal the demodulated data are fed to the digital core 113, where the data are decoded in accordance with the selected digital protocol. Basically any type of digital protocol for wireless transmission can be selected. A Bluetooth adopted protocol is one example. Alternatively other proprietary or public standards could be used e.g. Widex' W-link, Oticon's EarStream, Siemens' TekConnect or Phonak's iCom technologies.

Next the received wireless data are fed to the back-end chip 121 for standard hearing aid processing.

The inductive short-range radio 101 additionally has modulating means 126 and a power amplifier 127. The modulating means 126 receives a data signal to be transmitted over the inductive link from the digital core 113 and provides a modulated data signal to be amplified by the power amplifier 127 and the amplified signal is fed to the inductive antenna 103 for wireless transmission.

In a variation of the embodiment according to FIG. 1 the data signals, transmitted and received using the inductive short-range radio, are used for synchronizing and optimizing the operation of a left and right hearing aid of a binaural hearing aid system. When the left and right hearing aids are adapted to be worn in or at a left and right ear of a hearing aid user, it is especially advantageous to employ an inductive wireless link because the magnetic field signals transmitted by the inductive short-range wireless link are not significantly attenuated by the head of the hearing aid user. Therefore a wireless link with a low power consumption can be realized between the two hearing aids by implementing an inductive short-range radio as described above.

The long-range radio 102 is adapted to pick up an electromagnetic signal, with a carrier frequency of 865 MHz. The electromagnetic signal is picked up by an far-field antenna 114, in the form of an electrical antenna, hereby providing a second electrical input signal. According to the embodiment of FIG. 1 the electrical antenna is a quarter wavelength helical antenna. Such antennas are commercially available from e.g. the company Neosid.

In variations of the embodiment according to FIG. 1 the electrical antenna can be selected from a great variety of antenna types including e.g. Meander line antenna, fractal antenna, loop antenna and dipole antenna.

In a variation of the embodiment according to FIG. 1, the carrier frequency is 915 MHz. The carrier frequency of 865 MHz corresponds to the european SRD band whereas the 915 MHz corresponds to the american ISM band. Basically any carrier frequency in the range between say 400 MHz and 5 GHz, or more specifically in the range between 850 and 950 MHz, can be used if the national regulations so permit.

In a further variation of the embodiment according to FIG. 1 the far-field antenna 114 is tuned to the selected carrier frequency of the far-field radio using a matching circuit (not shown).

The second electrical input signal is amplified to a suitable level by the second LNA 115 hereby providing a second amplified input signal.

In a variation of the embodiment according to FIG. 1 the second amplified input signal could be fed to a set of pre-amplifiers similar to the pre-amplifiers 106 of the inductive short-range radio.

Next the second amplified input signal is mixed down in frequency using the local oscillator 109, the second PLL 118 and the second mixer 116. The local oscillator 109 has a clock frequency of 32 MHz and the second PLL 118 interacts with the local oscillator 109, using the well known principles of PLL based frequency synthesizers in order to provide a mixing signal with a frequency of 854.4 MHz. The mixing signal is multiplied with the second amplified input signal in the second mixer 116 in order to provide a second frequency mixed input signal.

The second frequency mixed input signal comprises a sum frequency component with a center frequency of 1719.4 MHz and a difference frequency component with a center frequency of 10.6 MHz. The second band pass filter 117 has a center frequency of 10.6 MHz and a bandwidth in the range of 1 MHz to 5 MHz.

The second band pass filter 117 therefore provides a second filtered input signal where the sum frequency component is removed from the first intermediate input signal and the difference frequency component is maintained.

In a variation of the embodiment of FIG. 1 the second band pass filter 117 is a digital filter designed such that the image of the desired signal is effectively attenuated. The image of the desired signal is the result of frequency down mixing a signal that is equally far from the local oscillator frequency as the desired signal, but on the other side of the local oscillator frequency, thus the image of the desired signal originates from a signal with a center frequency of 843.8 MHz. On-chip image rejection techniques are well known in the art and further details can be found in e.g.: "On-chip image reject techniques for wireless receivers"; Nora Yan; University of Toronto Department of Electrical and Computer Engineering; Nov. 12, 2001 and "Architectures and circuits for RF CMOS receivers"; Behzad Razavi, University of Calif., Electrical Engineering Department, IEEE 1998 Custom Integrated Circuits Conference.

It is a specific advantage to position the band pass filter 117 down stream of the mixer 116 because it makes the band pass filter independent on the selected carrier frequency for the long term radio, because the mixing signal, provided by the frequency synthesizer, can be adapted to the carrier frequency instead of having to select between different fixed filters.

In a further variation of the embodiment of FIG. 1 a conventional off-chip filter (not shown) is interposed between the antenna 114 and the second LNA 115. Hereby a stronger attenuation can generally be achieved compared to on-chip image rejection techniques. However, the use of an off-chip filter may have negative implications with respect to the noise figure and power dissipation in the LNA 115. According to a specific variation the off-chip filter will be implemented as part of an antenna matching circuit.

In yet another variation a conventional off-chip filter is interposed between the second LNA 115 and the mixer 116.

In case an off-chip filter is included, as described in the variations above, the second band pass filter 117 may be omitted because the inductive antenna 103 and the resonance capacitor 104 provides a highly selective band pass filter at a center frequency of 10.6 MHz.

The second filtered input signal is coupled to the inductive antenna 103 simply by connecting the output from the second band pass filter 117 with the inductive antenna 103 through the coupling capacitor 120. The capacitance of the coupling capacitor 120 is 100 fF. With such a small capacitance value the coupling capacitor 120 can be implemented on-chip hereby providing ease of implementation and the required precision of the desired capacitance value.

In a variation of the embodiment of FIG. 1 the output from the second band pass filter 117 is inductively coupled to the inductive antenna 103. The inductive coupling can be implemented by positioning the end of the electrical conductor, that guides the second filtered intermediate input signal, close to the inductive antenna 103. In a further variation said electrical conductor ends in an inductive component such as a coil.

Generally a capacitive coupling to the inductive antenna 103 is preferred due to the efficient coupling that can be obtained. An inductive coupling to the inductive antenna has an advantageous aspect in that the coupling does not require electrical contact, whereby the long-range wireless receiver could be implemented as an independent add-on to the hearing aid system.

By coupling the second filtered input signal to the inductive antenna 103 a highly selective filtering is achieved and subsequently demodulation and decoding can be carried out by using the inductive short-range radio 102.

In a variation of the embodiment according to FIG. 1, the binaural hearing aid system comprises an external device that is configured to receive an audio signal from a television through a cabled connection and wirelessly transmit the audio signal to the two hearing aids of the binaural hearing aid system using the long-range radio. This system is advantageous to most known systems because the user does not need a further external device worn close to the two hearing aids. In most known systems the further external device is required because the hearing aids only comprise an inductive short-range radio that is not suited for transmitting the audio signal from the first external device and to the hearing aids over the distances typical involved when watching television, without excessive power consumption. In further variations of the variation given above the television is replaced by any type of device capable of providing an audio signal such as e.g. a computer, mp3 player or a mobile phone.

Figure 2:
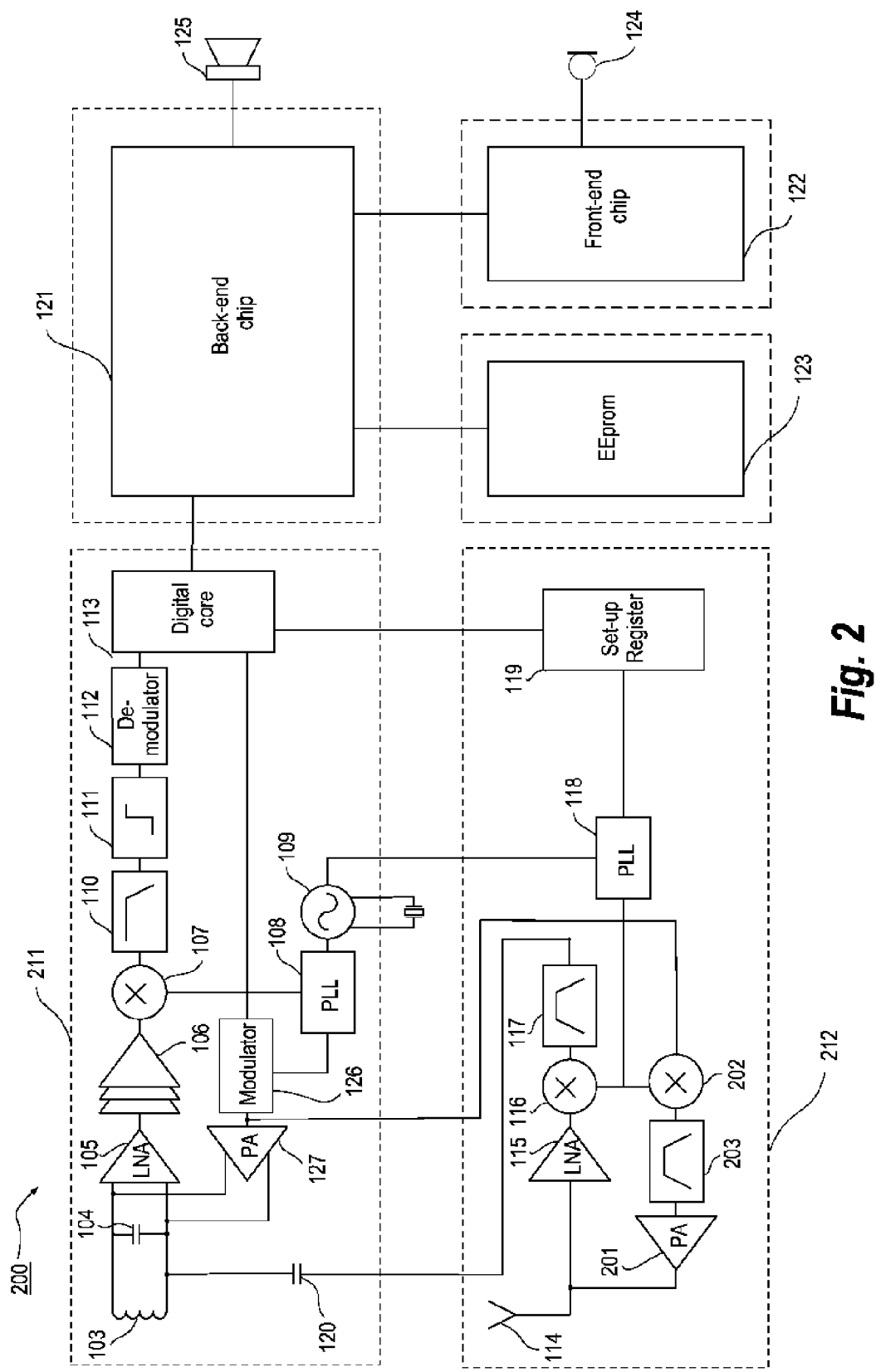
FIG. 2 illustrates highly schematically a hearing aid according to a second embodiment of the invention.

Reference is now given to FIG. 2, which illustrates highly schematically a hearing aid according to a second embodiment of the invention. The hearing aid 200 comprises an inductive short-range radio 211 and a long-range radio 212. Besides the components, that have been described with reference to FIG. 1, the hearing aid 200 comprises a third band pass filter 203, a third mixer 202 and a power amplifier 201.

Data to be transmitted from the hearing aid 200 is provided by the digital core 113 and fed to the modulator 126 that provides a first modulated output signal that is multiplied with a mixing signal in the third mixer 202. Next the mixer 202 outputs a signal that is filtered in the third band pass filter 203 such that the difference frequency is removed and the sum frequency is maintained whereby a frequency up-mixed signal is provided. Finally the frequency up-mixed signal is amplified in the power amplifier 201 and wirelessly transmitted using the far-field antenna 114.

In a variation of the embodiment according to FIG. 2, a binaural hearing aid system is adapted to wirelessly communicate with a hearing aid fitting system using the long-range radio. This enables the binaural hearing aid system to be fitted in a truly wireless manner where the hearing aid user does not need to wear an external device close to the hearing aids.

During a hearing aid fitting the hearing aid 200 is required to use the long range radio to transmit data, such as e.g. the current hearing aid setting and various acknowledgement signals to the fitting system and to receive data, such as e.g. the new hearing aid setting and various control signals.

Other modifications and variations of the structures and procedures will be evident to those skilled in the art.

We claim:

1. A hearing aid comprising:
   first wireless link component configured to receive a first data signal on a first antenna using a first carrier frequency;
   second wireless link component configured to receive a second data signal on a second antenna using a second carrier frequency; wherein the second wireless link component includes a first band pass filter that includes said first antenna of the first wireless link component and further comprises a frequency mixer configured to provide a frequency mixed signal with a down-mixed intermediate carrier frequency, wherein the down-mixed intermediate carrier frequency corresponds to the first carrier frequency.

2. The hearing aid according to claim 1, wherein said first band pass filter is configured to pass said down-mixed intermediate carrier frequency of the frequency mixed signal.

3. The hearing aid according to claim 1, wherein said first antenna is adapted for receiving an inductive wireless signal.

4. The hearing aid according to claim 1, wherein said first antenna is a coil.

5. The hearing aid according to claim 1, wherein the frequency mixed signal is supplied to said first antenna.

6. The hearing aid according to claim 1, wherein said second wireless link component comprises a second band pass filter positioned up stream of the first band pass filter.

7. The hearing aid according to claim 6, wherein said second band pass filter is positioned downstream of the frequency mixer and configured to filter out an image of the frequency mixed signal.

8. The hearing aid according to claim 6, wherein said second band pass filter is positioned up stream of the frequency mixer and configured to filter out noise signals picked up by said second antenna of the second wireless link component.

9. The hearing aid according to according to claim 1 wherein said first data signal and said second data signal are demodulated using the same digital demodulator.

10. The hearing aid according to claim 1 wherein said first data signal and said second data signal are decoded using the same wireless protocol component.

11. The hearing aid according to according to claim 1 wherein said first carrier frequency is in the range between 3 and 12 MHz.

12. The hearing aid according to claim 1 wherein said second carrier frequency is in the range between 850 and 950 MHz.

13. A hearing aid comprising first wireless link component configured to receive a first data signal using a first carrier frequency;
   a second wireless link component configured to receive a second data signal using a second carrier frequency;
   wherein the second wireless link component comprises a frequency mixer configured to provide a frequency mixed signal with a down-mixed intermediate carrier frequency, wherein the down-mixed intermediate carrier frequency corresponds to said first carrier frequency and wherein a first electrical antenna of the first wireless link component also forms part of a first band filter of the second wireless link component.

14. A binaural hearing aid system comprising a first hearing aid comprising first wireless link component configured to receive a first data signal on a first antenna using a first carrier frequency; a second wireless link component configured to receive a second data signal on a second antenna using a second carrier frequency; wherein the second wireless link component comprises frequency mixer configured to provide a frequency mixed signal with a down-mixed intermediate carrier frequency, wherein the down-mixed intermediate carrier frequency corresponds to said first carrier frequency, and a second hearing aid, wherein said first wireless link component is configured to exchange data between said first and said second hearing aid, and wherein said second wireless link component includes a band pass filter and said first antenna forms at least a part of said band pass filter.

15. The binaural hearing aid system according to claim 14, wherein said second wireless link component is configured to exchange data with a hearing aid fitting system.

16. The binaural hearing aid system according to claim 14, wherein said second wireless link component is configured to receive data representing audio from an external source.

17. A method of receiving a first wireless signal and a second wireless signal in a hearing aid comprising the steps of
- receiving a first wireless signal, having a first carrier frequency, using a first electrical antenna;
- receiving a second wireless signal, having a second carrier frequency, using a second electrical antenna;
- frequency mixing said second wireless signal, hereby providing a frequency mixed signal with a down-mixed intermediate carrier frequency;
- band pass filtering said frequency mixed signal using a band pass filter, wherein said band pass filter includes said first electrical antenna and is configured to pass said down-mixed intermediate carrier frequency, hereby providing a frequency down-mixed signal;
- demodulating and decoding said first wireless signal using first demodulating and decoding means; and
- demodulating and decoding said frequency down-mixed signal using said first demodulating and decoding means.

18. A hearing aid comprising:
- first wireless link component configured to receive a first data signal on a first antenna using a first carrier frequency;
- second wireless link component configured to receive a second data signal on a second antenna using a second carrier frequency; wherein the second wireless link component comprises a frequency mixer configured to provide a frequency mixed signal with a down-mixed intermediate carrier frequency, wherein the down-mixed intermediate carrier frequency corresponds to said first carrier frequency, and wherein said first antenna forms at least part of a band pass filter for filtering said frequency mixed signal.

* * * * *